W. A. GORDON.
STUFFING BOX.
APPLICATION FILED MAY 5, 1913.

1,074,259.

Patented Sept. 30, 1913.

Witnesses:
Josephine K. Strempfer
Louis Lucia.

Inventor:
William Alexander Gordon
by Harry P. Williams
atty

UNITED STATES PATENT OFFICE.

WILLIAM ALEXANDER GORDON, OF SHELTON, CONNECTICUT.

STUFFING-BOX.

1,074,259.   Specification of Letters Patent.   Patented Sept. 30, 1913.

Application filed May 5, 1913. Serial No. 765,476.

*To all whom it may concern:*

Be it known that I, WILLIAM ALEXANDER GORDON, a citizen of the United States, residing at Shelton, in the county of Fairfield and State of Connecticut, have invented a new and useful Improvement in Stuffing-Boxes, of which the following is a specification.

In some classes of apparatus, for instance such pneumatic shaft-clutches as are shown in U. S. Patent No. 998,499, July 15, 1911, it is necessary to conduct operating fluid through a rotating shaft to the parts which are to be actuated by the fluid pressure. This necessitates the provision of means for connecting a stationary part of the fluid duct with the fluid duct in the rotatory shaft.

The present invention relates to means which are designed to make fluid tight joints between a rotatory shaft that contains a fluid duct, and a stationary case which is connected with the stationary part of the fluid duct, so that there will be a free flow of fluid under pressure from the source of supply into the rotatory shaft without leakage.

The object of this invention is to provide a simple, durable and easily manipulated stuffing box for a rotatory shaft, which will insure at all times and with but little friction and a minimum amount of wear tight joints between the stationary and rotatory parts.

Figure 1:
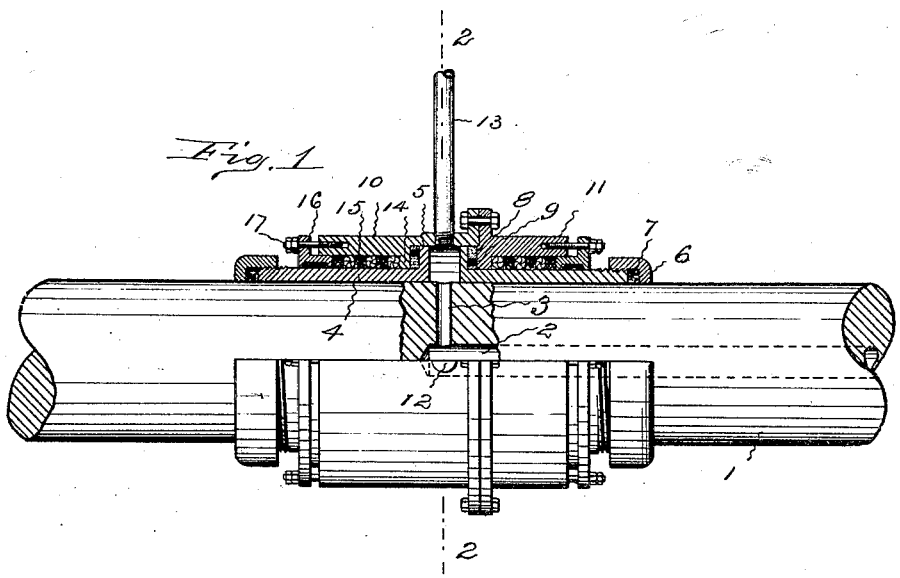
Figure 2:
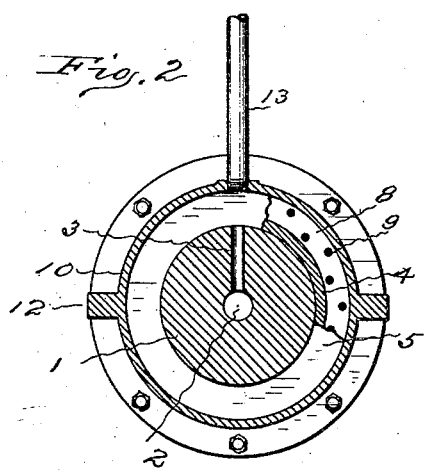

Figure 1 of the accompanying drawings shows a side view, with part cut in central section, of a shaft provided with a stuffing box which embodies this invention. Fig. 2 shows a transverse section of the same on the plane indicated by the dotted line 2—2 on Fig. 1.

In the views the shaft 1 through which air under pressure is to pass has a longitudinal passage 2 and a transverse opening 3 from the longitudinal opening to the periphery. Located on this shaft and closely fitted thereto each side of the transverse opening is a sleeve 4. These sleeves at their adjacent ends have outwardly extending flanges 5 which form the side walls of an annular chamber about the periphery of the shaft in the plane of the transverse opening that leads from the periphery to the longitudinal passage in the shaft. The flanged sleeves while fitting the shaft tightly and being designed to rotate therewith are permitted a little movement longitudinally of the shaft. Turned on the outer end of each sleeve is a cap nut 6 between which and the sleeve end is a small amount of packing 7. These nuts when turned up compress these packings against the ends of the sleeves in such manner as to prevent any possible leakage of fluid between the shaft and the sleeves. As the nuts, packings and sleeves all rotate with the shaft there not only is no wear upon the packings but they may be compressed as solidly as need be to make perfectly tight joints. On the sleeves next to the flanges are placed rings 8 which have as smooth surfaces as possible. These rings are preferably made of bronze and are desirably lubricated with graphite plugs 9. Over these parts is placed the stationary casing which is composed of a section 10 on one side and a section 11 on the other side, the sections being flanged and bolted together. This casing has lugs 12 or any other means which are designed to be connected with some stationary part so as to prevent the casing from turning with and moving lengthwise of the shaft. Through the casing section 10 opposite the chamber between the sleeve flanges is the inlet pipe 13, which leads from the source of fluid supply. Each of the casing parts has an inwardly extending flange 14. The lubricated bronze rings lie between the outer surfaces of the sleeve flanges and the inner surfaces of the casing flanges and are so fitted that they remain stationary with the casing.

The pressure of the fluid which enters the casing through the inlet pipe is exerted against the flanged ends of the sleeves and forces the sleeves outward from each other and against the rings which are held by the casing. As the ring surfaces and the surfaces of the flanges of the sleeves and the casing are made very perfect and as the fluid pressure tends to force these parts together longitudinally of the shaft, the joints remain tight no matter how great the wear nor how high the fluid pressure. In fact, as the flanged sleeves rotate and the rings remain stationary all wear tends to improve the fitting of the engaging surfaces and make the joints closer, thus after a short run there is practically no leakage even with air, which is difficult to hold, under high pressures. In order, however, to provide for any emergency that might arise, especially in starting up a machine with a new stuffing box, a packing 15 is inserted into the gland in the outer end of each of the sections of the stationary casing. These packings may be of any common type and may be held in place by the gland sleeves 16 which are drawn to the casing by bolts 17. These supplementary packings may be compressed at any time as much as may be desired while the shaft is running by turning up the nuts on the bolts which hold the stationary gland sleeves. The case of this stuffing box remains stationary and consequently it is possible not only to tighten the supplementary packing but to lubricate all of the parts at any time while the shaft is running. As the rings form the main packing and these are held between the flanges of the stationary case and the flanges of the sleeves, the main joints are closed with a force depending upon the pressure of the fluid which they are designed to prevent from leaking, and as these parts tend to wear smooth under the pressure the joints become tighter and tighter as the parts wear. This stuffing box while simple and efficient does not lose its efficiency by wear and the parts so act that there is always the highest efficiency and the least possible leakage even when the stuffing box has had long service with air under very high pressure.

The invention claimed is:

1. A stuffing box for a rotary shaft having sleeves designed to rotate with but move longitudinally upon the shaft, a stationary casing surrounding said sleeves with a fluid opening through the casing between the sleeves, and packing rings between the sleeves and the casing, said rings being subject to compression between these parts by the longitudinal movement from each other of the sleeves.

2. A stuffing box for a rotary shaft having sleeves designed to rotate with but move longitudinally upon the shaft, a stationary sectional casing surrounding said sleeves with a fluid opening through the casing between the sleeves, and packing rings between the sleeves and the casing, said rings being subject to compression between these parts by the longitudinal movement from each other of the sleeves.

3. A stuffing box for a rotary shaft having sleeves with outwardly extending flanges, a casing with inwardly extending flanges, packing rings between the sleeve flanges and the casing flanges, and a fluid duct opening through the casing to the space between the sleeve flanges.

4. A stuffing box for a rotary shaft having sleeves with outwardly extending flanges, a casing with inwardly extending flanges, packing rings between the sleeve flanges and the casing flanges, packing between the outer surfaces of the sleeves and the inner surfaces of the casing, and sleeves secured to the casing for holding the said packing between the sleeves and the casing.

5. A stuffing box for a rotary shaft having a fluid duct opening through its periphery, said box comprising a casing that is adapted to be stationarily mounted, sleeves adapted to rotate and also move longitudinally in said casing, and metallic rings located between inwardly extending parts of the casing and outwardly extending parts of the sleeves and subject to the longitudinal thrust and rotary wear of said sleeve parts when in use.

6. The combination of a rotary shaft having a fluid duct, flanged sleeves fitting the shaft, said sleeves adapted to rotate with and to move longitudinally upon the shaft, nuts and packings at the ends of the sleeves, a stationary casing surrounding the sleeves, said casing having a fluid duct opening through it to the space between the flanges of the sleeves, packing rings between the casing and the sleeve flanges, packings between outer surfaces of the sleeves and inner surfaces of the casing, and gland sleeves secured to the casing and adapted to hold said packings in place.

7. The combination of a shaft having a fluid duct, a stationary casing surrounding the shaft about the opening from the fluid duct, sleeves adapted to rotate with the shaft and move longitudinally thereon inside of the casing, said sleeves terminating at their inner ends each side of the fluid opening, metallic rings arranged between the sleeves and the casing and adapted to be compressed between the parts by the outward longitudinal movement of the sleeves.

WILLIAM ALEXANDER GORDON.

Witnesses:
M. E. DERMODY,
WILLIAM J. CRABTREE.